(12) United States Patent
Lin

(10) Patent No.: US 11,396,766 B2
(45) Date of Patent: Jul. 26, 2022

(54) PIVOT DEVICE HAVING COMPONENTS TRANSLATABLE DURING ROTATION

(71) Applicant: Leohab Enterprise Co., Ltd., Taichung (TW)

(72) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 219 days.

(21) Appl. No.: 16/904,810

(22) Filed: Jun. 18, 2020

(65) Prior Publication Data

US 2021/0396056 A1 Dec. 23, 2021

(51) Int. Cl.
*E05D 3/12* (2006.01)
*G06F 1/16* (2006.01)

(52) U.S. Cl.
CPC .......... *E05D 3/122* (2013.01); *G06F 1/1681* (2013.01); *E05Y 2900/606* (2013.01); *G06F 1/1616* (2013.01)

(58) Field of Classification Search
CPC ....... E05D 3/122; E05D 3/022; G06F 1/1681; G06F 1/1624; G06F 1/1616; E05Y 2900/606; H04M 1/0235; H04M 1/0237; H04M 1/0216; H04M 1/022; Y10T 16/541; Y10T 16/545; Y10T 16/5457; Y10T 16/547
USPC .............. 16/354, 362, 364, 366; 361/679.27, 361/679.06; 455/575.4, 575.3; 379/433.11, 433.12
See application file for complete search history.

(56) References Cited

U.S. PATENT DOCUMENTS

| | | | | |
|---|---|---|---|---|
| 7,843,698 B2* | 11/2010 | Takizawa | ................ | G06F 1/181 361/801 |
| 10,254,794 B1* | 4/2019 | Wu | ........................ | G06F 1/1601 |
| 10,928,865 B1* | 2/2021 | Nakada | .................... | G06F 1/166 |
| 11,099,611 B2* | 8/2021 | Hallar | .................... | G06F 1/1618 |
| 2012/0314980 A1* | 12/2012 | Chen | .................... | H04M 1/0237 384/26 |
| 2012/0328222 A1* | 12/2012 | Chen | ..................... | G06F 1/1624 384/26 |
| 2014/0251041 A1* | 9/2014 | Hsu | ........................ | F16H 21/12 74/63 |

(Continued)

FOREIGN PATENT DOCUMENTS

WO WO-2014120120 A1 * 8/2014 ........... G06F 1/1618

*Primary Examiner* — William L Miller
(74) *Attorney, Agent, or Firm* — Alan D. Kamrath; Karin L. Williams; Mayer & Williams PC

(57) ABSTRACT

A pivot device invention includes a base and a translating unit. The base includes a side having first and second connecting portions. The translating unit includes a first sliding seat, a pivot, a first wheel, a second wheel, and a first interlink. The sliding seat is mounted to the first connecting portion and is movable relative to the base. The pivot and the second wheel are pivotably mounted to the sliding seat. The first wheel is mounted to and jointly rotatable with the pivot. Rotation of the first wheel is in an interlocking relationship with rotation of the second wheel. The first interlink is mounted to and jointly rotatable with the second wheel. The first interlink includes a first sliding portion mounted to the second connecting portion and movable relative to the base. Rotation of the first interlink actuates the sliding seat to move relative to the base.

10 Claims, 8 Drawing Sheets

(56) References Cited

U.S. PATENT DOCUMENTS

| | | | |
|---|---|---|---|
| 2015/0040704 A1* | 2/2015 | Hsu | E05D 3/12 |
| | | | 74/98 |
| 2015/0146362 A1* | 5/2015 | Meyers | G06F 1/1618 |
| | | | 16/354 |
| 2016/0363962 A1* | 12/2016 | Chiu | G06F 1/1681 |
| 2020/0225711 A1* | 7/2020 | Pelissier | G06F 1/1652 |
| 2020/0319728 A1* | 10/2020 | Wang | G06F 1/1624 |
| 2021/0089082 A1* | 3/2021 | Lee | G06F 1/203 |
| 2021/0096597 A1* | 4/2021 | Balaji | G06F 1/1624 |
| 2021/0096608 A1* | 4/2021 | Hallar | E05D 11/1028 |
| 2021/0096609 A1* | 4/2021 | Hallar | G06F 1/1616 |
| 2022/0019347 A1* | 1/2022 | Gao | G06F 3/03545 |

* cited by examiner

PIVOT DEVICE HAVING COMPONENTS TRANSLATABLE DURING ROTATION

BACKGROUND OF THE INVENTION

The present invention relates to a pivot device and, more particularly, to a pivot device having components translatable during rotation.

A notebook computer generally includes a screen and a keyboard. The screen and the keyboard of notebooks currently available in the market are mostly connected to each other by pivotal connection. Furthermore, given a maximum outer size, in order to obtain a screen with a maximum proportion, the screen is pivotably connected to a position adjacent to the front edge of the keyboard, such that only a small portion of the front edge of the keyboard behind the screen can be used to install the hot air outlet, which easily leads to poor heat dissipation.

In another approach, the screen and the keyboard of conventional notebook computers are pivotably connected by a single hinge or dual hinges, such that an area of the keyboard adjacent to the front edge is normally blocked by the screen and, thus, cannot have keys.

In view of the above drawbacks, a novel pivot device having components translatable during rotation is proposed to mitigate and/or obviate the disadvantages of the conventional structures.

BRIEF SUMMARY OF THE INVENTION

A pivot device according to the present invention includes a base and a translating unit. The base includes a side having a first connecting portion and a second connecting portion. The translating unit includes a first sliding seat, a pivot, a first wheel, a second wheel, and a first interlink. The sliding seat is mounted to the first connecting portion and is movable relative to the base. The pivot is pivotably mounted to the sliding seat. The first wheel is mounted to and jointly rotatable with the pivot. The second wheel is pivotably mounted to the sliding seat. Rotation of the first wheel is in an interlocking relationship with rotation of the second wheel. The first interlink is mounted to and jointly rotatable with the second wheel. The first interlink includes a first sliding portion mounted to the second connecting portion and movable relative to the base. Rotation of the first interlink actuates the sliding seat to move relative to the base.

In an example, the sliding seat is movable relative to the base in a direction perpendicular to another direction in which the first sliding portion is movable relative to the base.

In an example, the sliding seat includes a sliding block, a first sideboard, and a second sideboard. The first sideboard and the second sideboard are connected to two opposite sides of the sliding block. The first sideboard includes a first pivotal hole and a second pivotal hole. The second sideboard includes a third pivotal hole and a fourth pivotal hole. The pivot extends through the first pivotal hole and the third pivotal hole. The first wheel is mounted to the outer periphery of the pivot and is located between the first sideboard and the second sideboard. The second wheel includes a first shaft portion and a second shaft portion. The first shaft portion extends through the second pivotal hole. The second shaft portion extends through the fourth pivotal hole. The first interlink is disposed on a side of the first sideboard opposite to the second sideboard.

In an example, the outer periphery of the first wheel includes a first toothed portion. The second wheel includes a second toothed portion between the first shaft portion and the second shaft portion. The second toothed portion meshes with the first toothed portion.

In an example, the base includes a third connecting portion disposed on a side of the first connecting portion opposite to the second connecting portion. The translating unit includes a second interlink. The second interlink is connected to and jointly rotatable with the second wheel, wherein the second interlink is disposed on a side of the second sideboard opposite to the first sideboard. The second interlink includes a second sliding portion. The second sliding portion is mounted to the third connecting portion and is movable relative to the base. Rotation of the second interlink actuates the sliding seat to move relative to the base.

In an example, a first track and a first sidewall are disposed on a first side of the first connecting portion adjacent to the second connecting portion. A second track and a second sidewall are disposed on a second side of the first connecting portion adjacent to the third connecting portion. The first track and the second track respectively extend rectilinearly in two directions parallel to each other. The first sidewall and the second sidewall are parallel to each other and have a first width therebetween. A first leg and a second leg are disposed on a first face of the sliding block adjacent to the first connecting portion. The first leg is slidably received in the first track, wherein the second leg is slidably received in the second track, wherein the first leg and the second leg have a second width which is a maximum spacing between the first leg and the second leg. The first width is smaller than the second width, wherein the first wheel and the second wheel are disposed on a second face of the sliding block opposite to the first connecting portion. The first sideboard abuts against the first sidewall. The second sideboard abuts against the second sidewall.

In an example, the second connecting portion includes a first sliding groove. The first sliding portion is movably received in the first sliding groove. The third connecting portion includes a second sliding groove. The first sliding groove and the second sliding groove respectively extend rectilinearly in two directions parallel to each other. The second sliding portion is movably received in the second sliding groove.

In an example, the first connecting portion includes a limiting protrusion located between the first track and the second track. A face of the sliding block adjacent to the first connecting portion has a coupling groove located between the first leg and the second leg. The limiting protrusion is received in the coupling groove.

In an example, the base includes a slot in the limiting protrusion. The slot extends through the base to a face of the base opposite to the sliding seat. A tightening member, a resilient plate, and a plurality of fasteners are disposed on the face of the base opposite to the sliding seat. The tightening member abuts against the face of the base. The resilient plate abuts against a side of the tightening member opposite to the base. The plurality of fasteners extends through from a side of the resilient plate opposite to the tightening member, extends through the resilient plate, the tightening member, and the slot in sequence, and is secured to the sliding block by threading connection.

In an example, the first interlink is disposed around a first end of the second wheel. The second interlink is disposed around a second end of the second wheel opposite to the first interlink. A first fastener and a second fastener are coupled to the second wheel. The first fastener abuts against a side of the first interlink opposite to the second wheel. The first fastener extends through the first interlink and is secured to the second wheel by threading connection. The second fastener abuts against a side of the second interlink opposite to the second wheel. The second fastener extends through the second interlink and is secured to the second wheel by threading connection.

The present invention will become clearer in light of the following detailed description of illustrative embodiments of this invention described in connection with the drawings.

DETAILED DESCRIPTION OF THE INVENTION

Figure 1:
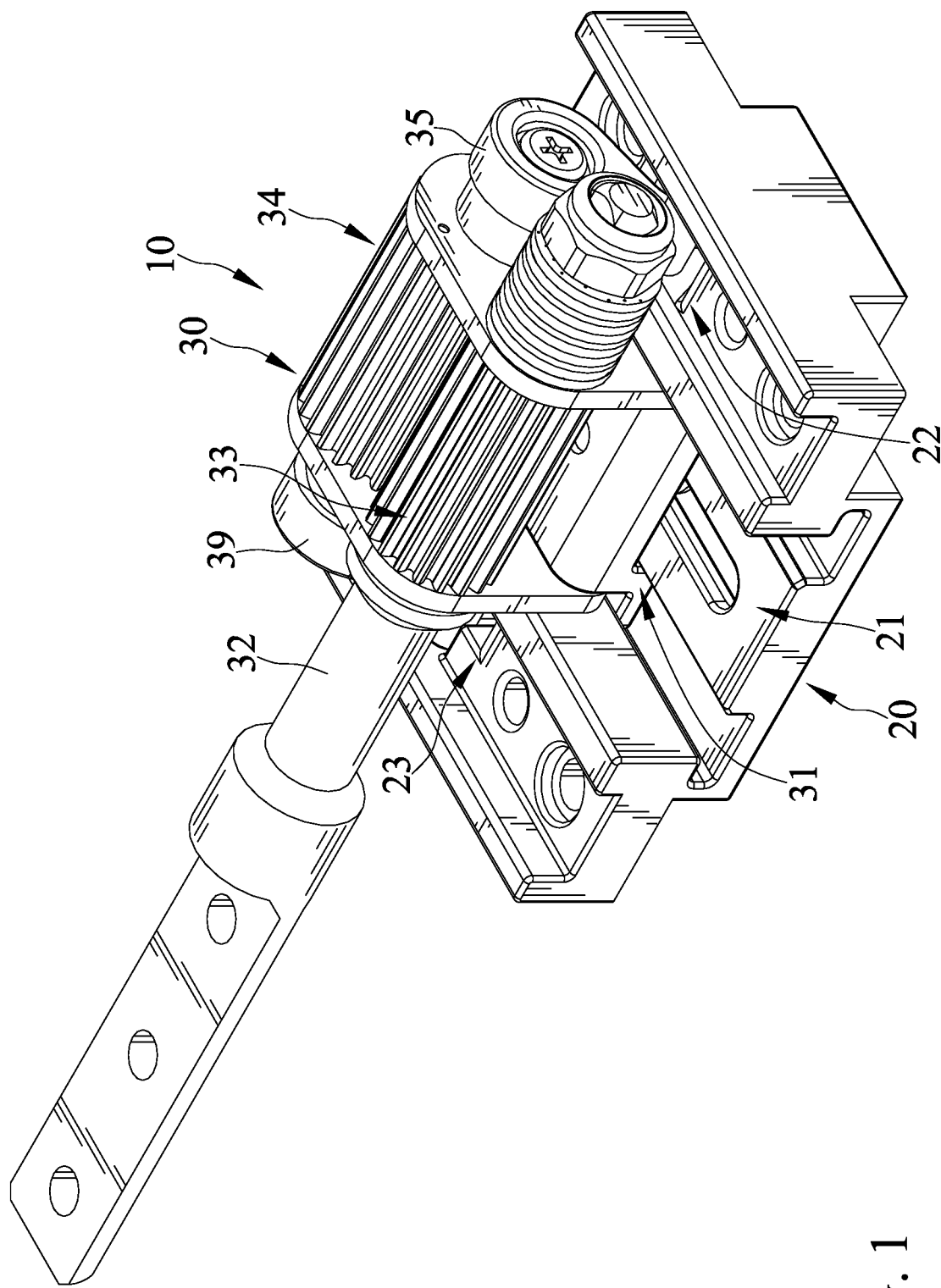
FIG. 1 is a perspective view of a pivot device having components translatable during rotation of an embodiment according to the present invention.
Figure 2:
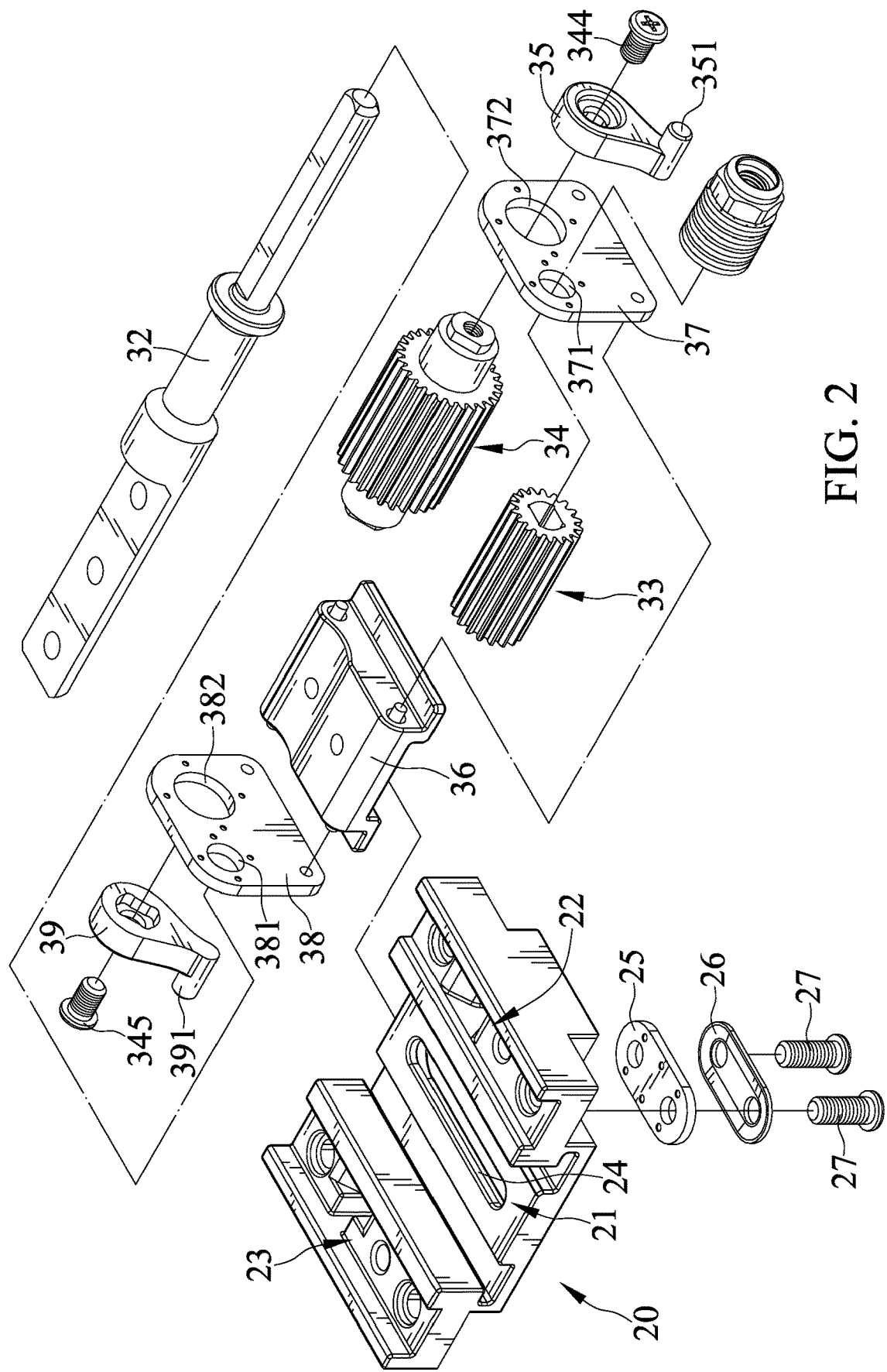
FIG. 2 is an exploded, perspective view of the pivot device of FIG. 1.
Figure 3:
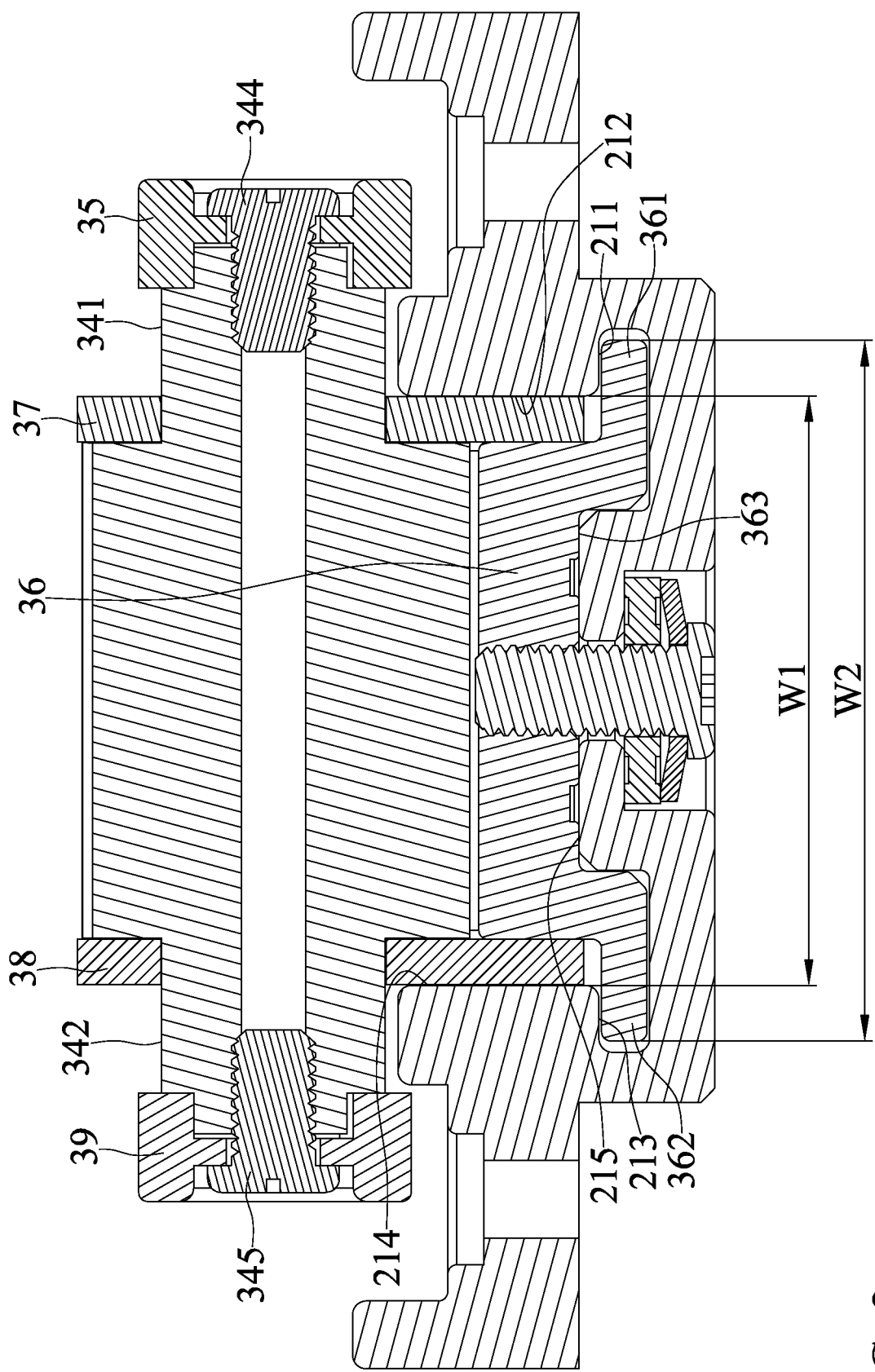
FIG. 3 is a cross sectional view of the pivot device of FIG. 1.
Figure 4:
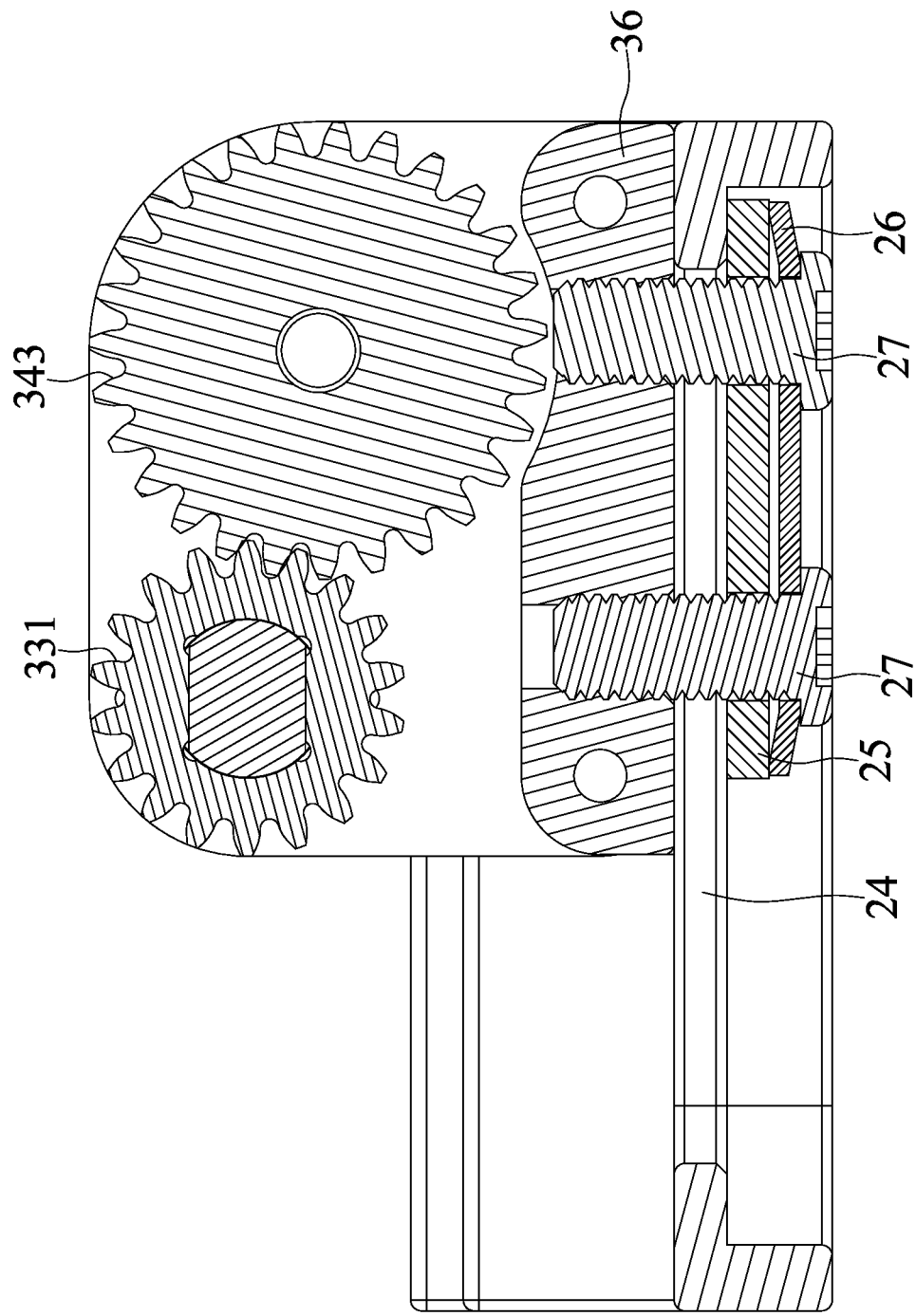
FIG. 4 is an enlarged cross sectional view illustrating a first connecting portion of the pivot device of FIG. 1.
Figure 5:
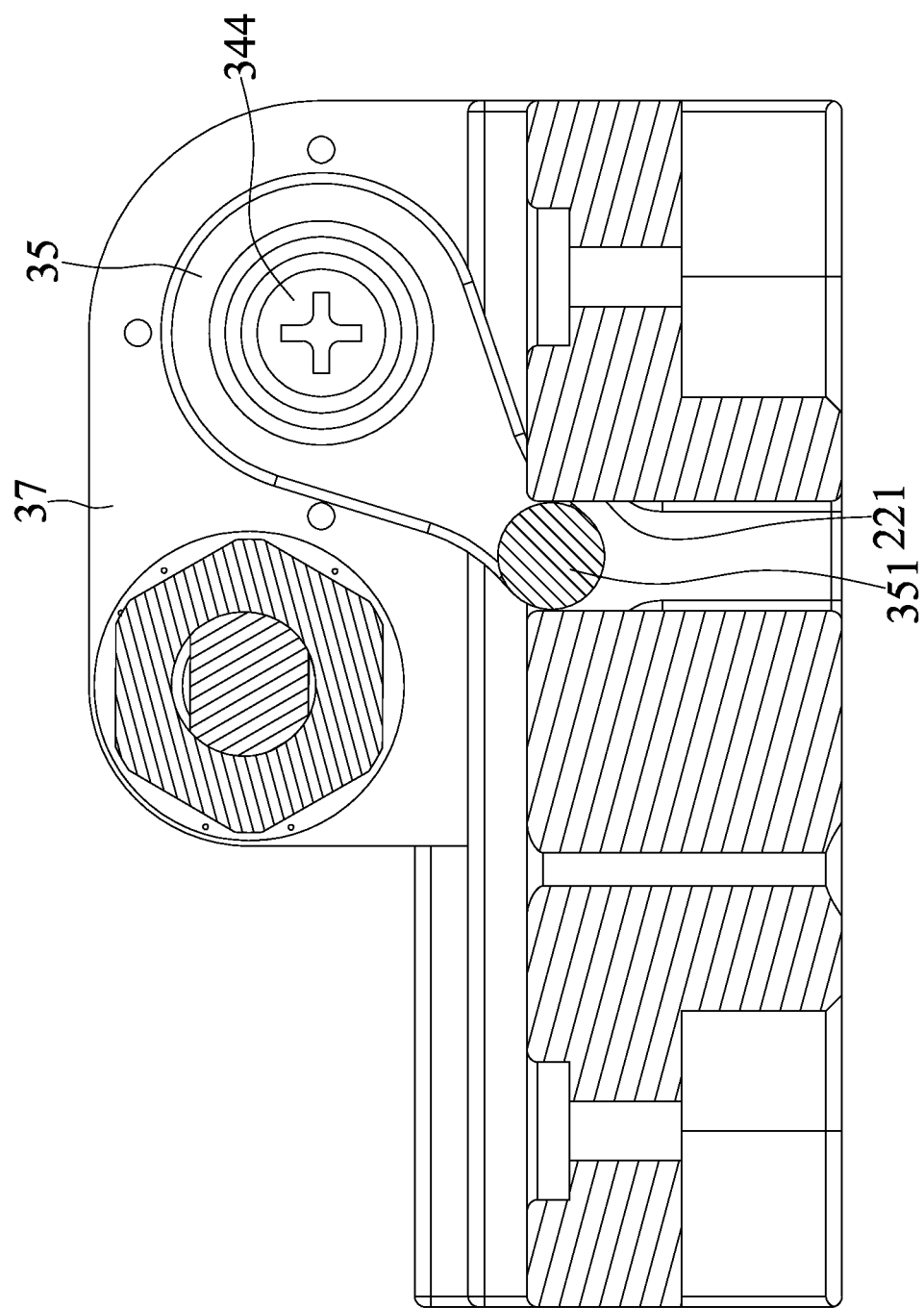
FIG. 5 is an enlarged cross sectional view illustrating a second connecting portion of the pivot device of FIG. 1.
Figure 6:
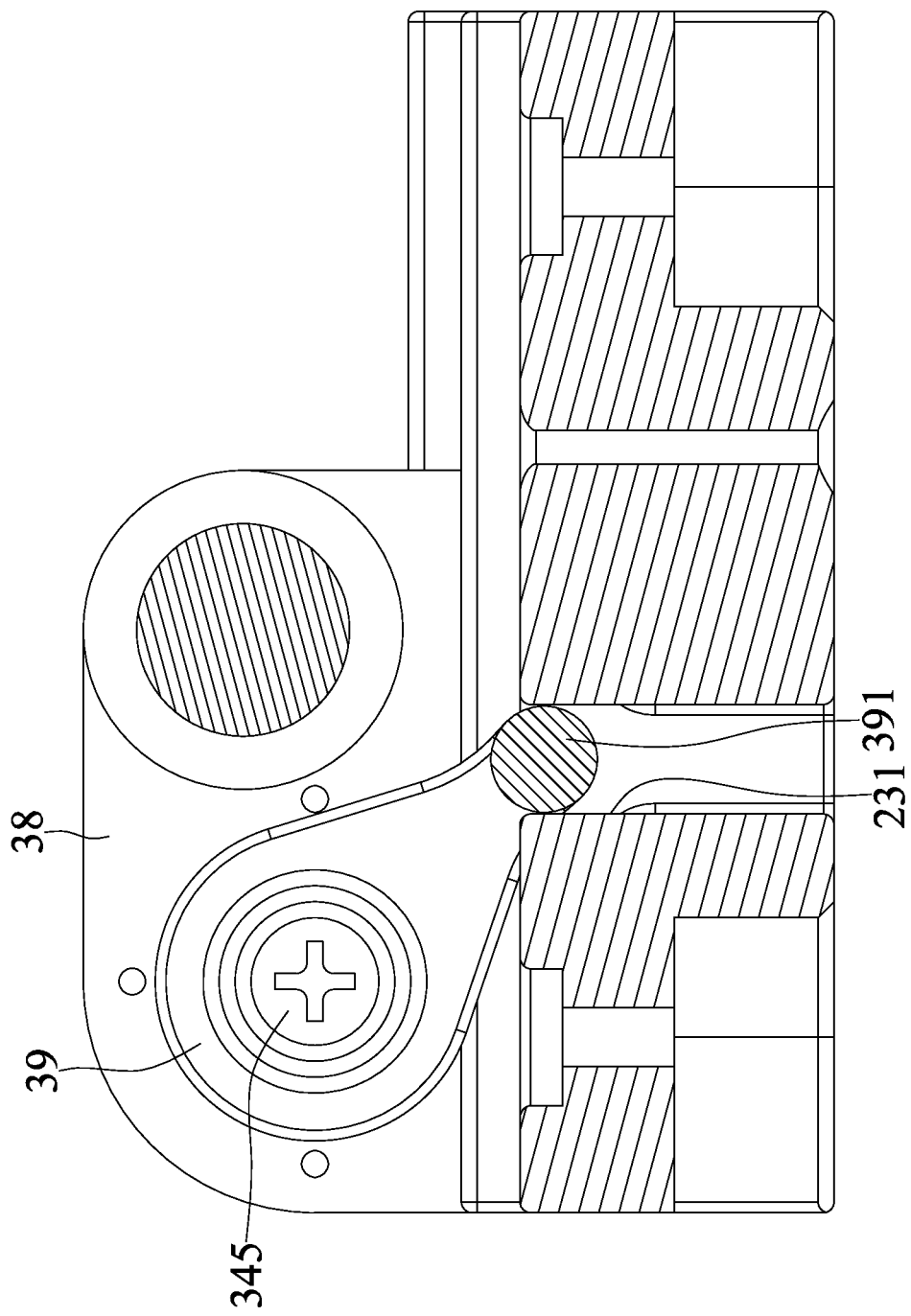
FIG. 6 is an enlarged cross sectional view illustrating a third connecting portion of the pivot device of FIG. 1.

With reference to FIGS. 1-6, a pivot device 10 having components translatable during rotation (hereinafter referred to as "pivot device") of an embodiment according to the present invention includes a base 20 and a translating unit 30. The base 20 includes a side having a first connecting portion 21 and a second connecting portion 22.

The translating unit 30 includes a first sliding seat 31, a pivot 32, a first wheel 33, a second wheel 34, and a first interlink 35. The sliding seat 31 is mounted to the first connecting portion 21 and is movable relative to the base 20. The pivot 32 is pivotably mounted to the sliding seat 31. The first wheel 33 is mounted to and jointly rotatable with the pivot 32. The second wheel 34 is pivotably mounted to the sliding seat 31. Rotation of the first wheel 33 is in an interlinking relationship with rotation of the second wheel 34. The first interlink 35 is mounted to and jointly rotatable with the second wheel 34. The first interlink 35 includes a first sliding portion 351 mounted to the second connecting portion 22 and movable relative to the base 20. Rotation of the first interlink 35 actuates the sliding seat 31 to move relative to the base 20.

The sliding seat 31 is movable relative to the base 20 in a direction that can be different from another direction in which the first sliding portion 351 is movable relative to the base 20. In this embodiment, the moving direction of the sliding seat 31 relative to the base 20 is perpendicular to the moving direction of the first sliding portion 351 relative to the base 20.

The sliding seat 31 includes a sliding block 36, a first sideboard 37, and a second sideboard 38. The first sideboard 37 and the second sideboard 38 are connected to two opposite sides of the sliding block 36. The first sideboard 37 includes a first pivotal hole 371 and a second pivotal hole 372. The second sideboard 38 includes a third pivotal hole 381 and a fourth pivotal hole 382. The pivot 32 extends through the first pivotal hole 371 and the third pivotal hole 381. The first wheel 33 is mounted to the outer periphery of the pivot 32 and is located between the first sideboard 37 and the second sideboard 38. The second wheel 34 includes a first shaft portion 341 and a second shaft portion 342. The first shaft portion 341 extends through the second pivotal hole 372. The second shaft portion 342 extends through the fourth pivotal hole 382. The first interlink 35 is disposed on a side of the first sideboard 37 opposite to the second sideboard 38.

The outer periphery of the first wheel 33 includes a first toothed portion 331. The second wheel 34 includes a second toothed portion 343 between the first shaft portion 341 and the second shaft portion 342. The second toothed portion 343 meshes with the first toothed portion 331.

The base 20 includes a third connecting portion 23 disposed on a side of the first connecting portion 21 opposite to the second connecting portion 22. The translating unit 30 includes a second interlink 39. The second interlink 39 is connected to and jointly rotatable with the second wheel 34. The second interlink 39 is disposed on a side of the second sideboard 38 opposite to the first sideboard 37. The second interlink 39 includes a second sliding portion 391. The second sliding portion 391 is mounted to the third connecting portion 23 and is movable relative to the base 20. Rotation of the second interlink 39 actuates the sliding seat 31 to move relative to the base 20.

A first track 211 and a first sidewall 212 are disposed on a first side of the first connecting portion 21 adjacent to the second connecting portion 22. A second track 213 and a second sidewall 214 are disposed on a second side of the first connecting portion 21 adjacent to the third connecting portion 23. The first track 211 and the second track 213 respectively extend rectilinearly in two directions parallel to each other. The first sidewall 212 and the second sidewall 214 are parallel to each other and have a first width W1 therebetween. A first leg 361 and a second leg 352 are disposed on a first face of the sliding block 36 adjacent to the first connecting portion 21. The first leg 361 is slidably received in the first track 211. The second leg 362 is slidably received in the second track 213. The first leg 361 and the second leg 362 have a second width W2 which can be the maximum spacing between the first leg 361 and the second leg 362. The first width W1 is smaller than the second width W2. The first wheel 33 and the second wheel 34 are disposed on a second face of the sliding block 36 opposite to the first connecting portion 21. The first sideboard 37 abuts against the first sidewall 212. The second sideboard 38 abuts against the second sidewall 214.

The second connecting portion 22 includes a first sliding groove 221. The first sliding portion 351 is movably received in the first sliding groove 221. The third connecting portion 23 includes a second sliding groove 231. The first sliding groove 221 and the second sliding groove 231 respectively extend rectilinearly in two directions parallel to each other. The second sliding portion 391 is movably received in the second sliding groove 231.

The first connecting portion 21 includes a limiting protrusion 215 located between the first track 211 and the second track 213. A face of the sliding block 36 adjacent to the first connecting portion 21 has a coupling groove 363 located between the first leg 361 and the second leg 362. The limiting protrusion 215 is received in the coupling groove 363.

The base 20 includes a slot 24 in the limiting protrusion 215. The slot 24 extends through the base 20 to a face of the base 20 opposite to the sliding seat 31. A tightening member 25, a resilient plate 26, and a plurality of fasteners 27 are disposed on the face of the base 20 opposite to the sliding seat 31. The tightening member 25 abuts against the face of the base 20. The resilient plate 26 abuts against a side of the tightening member 25 opposite to the base 20. The plurality of fasteners 27 extends through from a side of the resilient plate 26 opposite to the tightening member 25, extends through the resilient plate 26, the tightening member 25, and the slot 24 in sequence, and is secured to the sliding block 36 by threading connection.

The first interlink 35 is disposed around a first end of the second wheel 34. The second interlink 39 is disposed around a second end of the second wheel 34 opposite to the first interlink 35. A first fastener 344 and a second fastener 345 are coupled to the second wheel 34. The first fastener 344 abuts against a side of the first interlink 35 opposite to the second wheel 34. The first fastener 344 extends through the first interlink 35 and is secured to the second wheel 34 by threading connection. The second fastener 345 abuts against a side of the second interlink 39 opposite to the second wheel 34. The second fastener 345 extends through the second interlink 39 and is secured to the second wheel 34 by threading connection.

Figure 7:
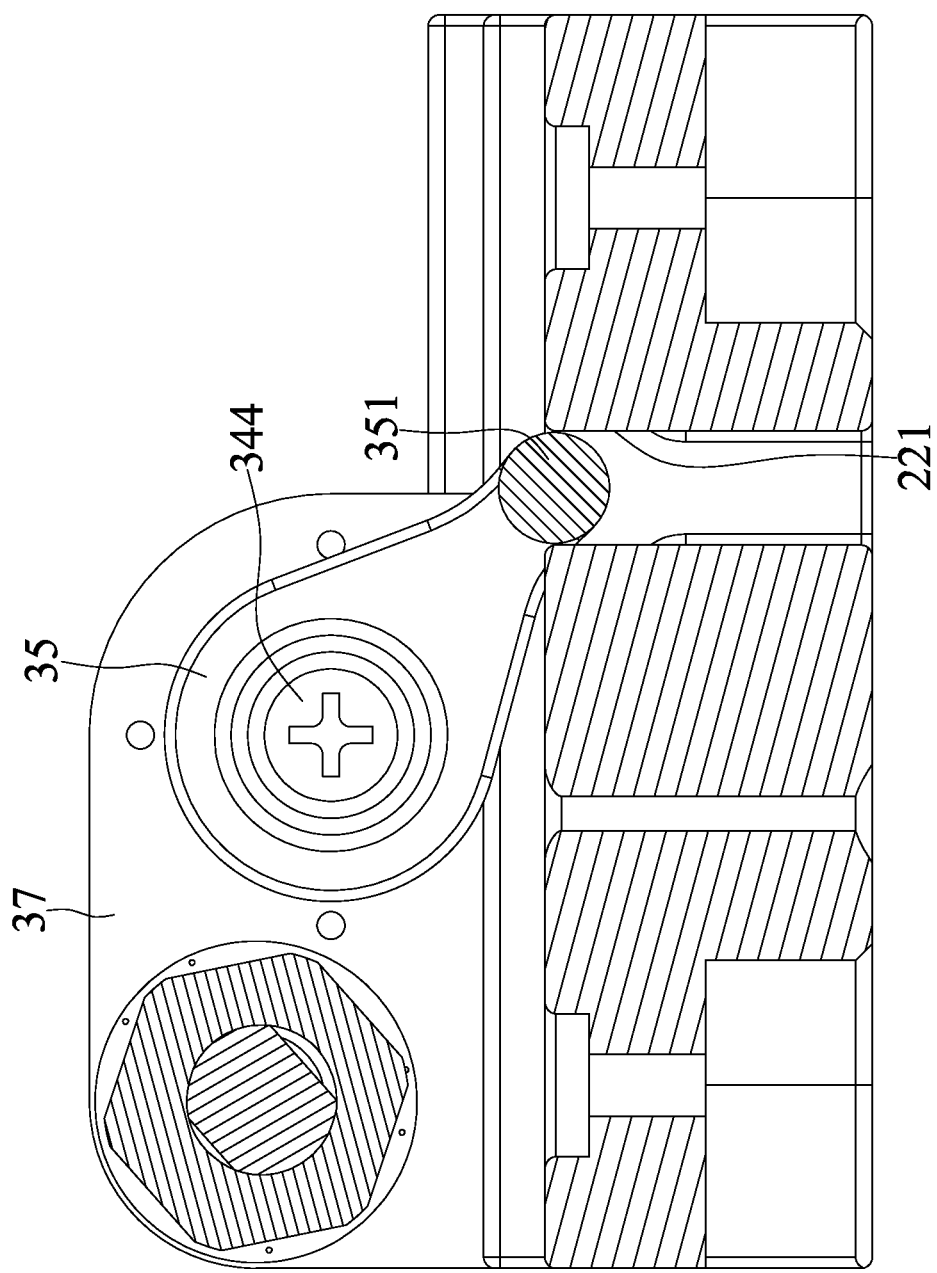
FIG. 7 is a cross sectional view illustrating displacement of a translating unit relative to a first sliding groove of the pivot device of FIG. 1.
Figure 8:
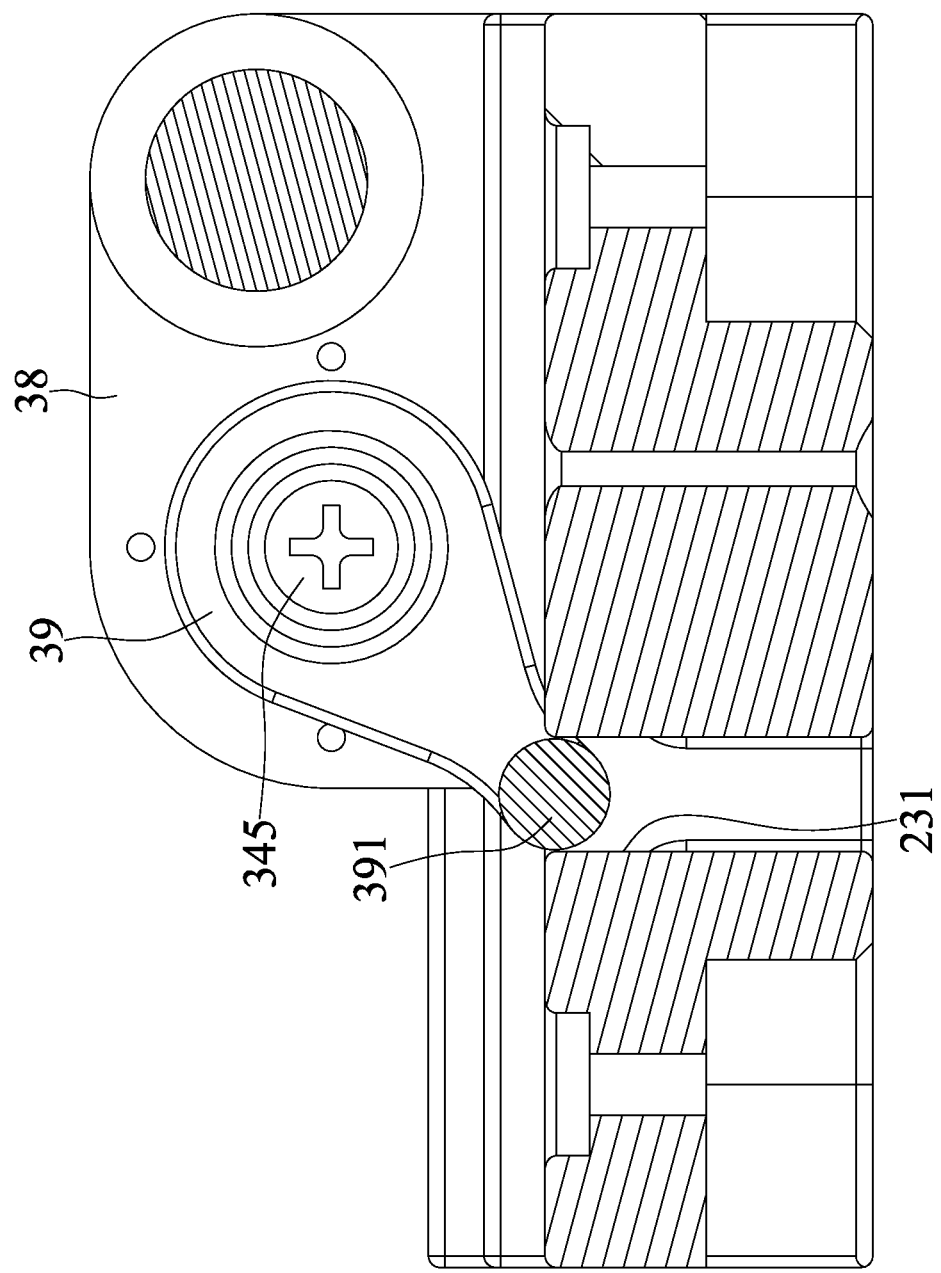
FIG. 8 is a cross sectional view illustrating displacement of a translating unit relative to a second sliding groove of the pivot device of FIG. 1.

FIGS. 7 and 8 show operation of the pivot device 10 according to the present invention. In use of the pivot device 10, when the pivot 32 rotates, the translating unit 30 is actuated to move due to the above structure. The pivot 32 can be coupled to a screen of a notebook computer, and the base 20 can be coupled to a keyboard of the notebook computer. When the screen is opened, the screen can also translate horizontally. In a case that the screen translates forwards, the area of a hot air outlet behind the keyboard can be increased. In another case that the screen translates rearwards, the increased space can be used to install buttons or other devices of different functions according to needs. Thus, the disposition of the components of the notebook computer can be versatile.

Although specific embodiments have been illustrated and described, numerous modifications and variations are still possible without departing from the scope of the invention. The scope of the invention is limited by the accompanying claims.

The invention claimed is:

1. A pivot device comprising:
a base including a side having a first connecting portion and a second connecting portion; and
a translating unit including a first sliding seat, a pivot, a first wheel, a second wheel, and a first interlink, wherein the sliding seat is mounted to the first connecting portion and is movable relative to the base, wherein the pivot is pivotably mounted to the sliding seat, wherein the first wheel is mounted to and jointly rotatable with the pivot, wherein the second wheel is pivotably mounted to the sliding seat, wherein rotation of the first wheel is in an interlocking relationship with rotation of the second wheel, wherein the first interlink is mounted to and jointly rotatable with the second wheel, wherein the first interlink includes a first sliding portion mounted to the second connecting portion and movable relative to the base, and wherein rotation of the first interlink actuates the sliding seat to move relative to the base.

2. The pivot device as claimed in claim 1, wherein the sliding seat is movable relative to the base in a direction perpendicular to another direction in which the first sliding portion is movable relative to the base.

3. The pivot device as claimed in claim 1, wherein the sliding seat includes a sliding block, a first sideboard, and a second sideboard, wherein the first sideboard and the second sideboard are connected to two opposite sides of the sliding block, wherein the first sideboard includes a first pivotal hole and a second pivotal hole, wherein the second sideboard includes a third pivotal hole and a fourth pivotal hole, wherein the pivot extends through the first pivotal hole and the third pivotal hole, wherein the first wheel is mounted to the outer periphery of the pivot and is located between the first sideboard and the second sideboard, wherein the second wheel includes a first shaft portion and a second shaft portion, wherein the first shaft portion extends through the second pivotal hole, wherein the second shaft portion extends through the fourth pivotal hole, and wherein the first interlink is disposed on a side of the first sideboard opposite to the second sideboard.

4. The pivot device as claimed in claim 3, wherein the outer periphery of the first wheel includes a first toothed portion, wherein the second wheel includes a second toothed portion between the first shaft portion and the second shaft portion, and wherein the second toothed portion meshes with the first toothed portion.

5. The pivot device as claimed in claim 4, wherein the base includes a third connecting portion disposed on a side of the first connecting portion opposite to the second connecting portion, wherein the translating unit includes a second interlink, wherein the second interlink is connected to and jointly rotatable with the second wheel, wherein the second interlink is disposed on a side of the second sideboard opposite to the first sideboard, wherein the second interlink includes a second sliding portion, wherein the second sliding portion is mounted to the third connecting portion and is movable relative to the base, and wherein rotation of the second interlink actuates the sliding seat to move relative to the base.

6. The pivot device as claimed in claim 5, wherein a first track and a first sidewall are disposed on a first side of the first connecting portion adjacent to the second connecting portion, wherein a second track and a second sidewall are disposed on a second side of the first connecting portion adjacent to the third connecting portion, wherein the first track and the second track respectively extend rectilinearly in two directions parallel to each other, wherein the first sidewall and the second sidewall are parallel to each other and have a first width therebetween, wherein a first leg and a second leg are disposed on a first face of the sliding block adjacent to the first connecting portion, wherein the first leg is slidably received in the first track, wherein the second leg is slidably received in the second track, wherein the first leg and the second leg have a second width which is a maximum spacing between the first leg and the second leg, wherein the first width is smaller than the second width, wherein the first wheel and the second wheel are disposed on a second face of the sliding block opposite to the first connecting portion, wherein the first sideboard abuts against the first sidewall, and wherein the second sideboard abuts against the second sidewall.

7. The pivot device as claimed in claim 6, wherein the second connecting portion includes a first sliding groove, wherein the first sliding portion is movably received in the first sliding groove, wherein the third connecting portion includes a second sliding groove, wherein the first sliding groove and the second sliding groove respectively extend rectilinearly in two directions parallel to each other, and wherein the second sliding portion is movably received in the second sliding groove.

8. The pivot device as claimed in claim 7, wherein the first connecting portion includes a limiting protrusion located between the first track and the second track, wherein a face of the sliding block adjacent to the first connecting portion has a coupling groove located between the first leg and the second leg, and wherein the limiting protrusion is received in the coupling groove.

9. The pivot device as claimed in claim 8, wherein the base includes a slot in the limiting protrusion, wherein the slot extends through the base to a face of the base opposite to the sliding seat, wherein a tightening member, a resilient plate, and a plurality of fasteners are disposed on the face of the base opposite to the sliding seat, wherein the tightening member abuts against the face of the base, wherein the resilient plate abuts against a side of the tightening member opposite to the base, wherein the plurality of fasteners extends through from a side of the resilient plate opposite to the tightening member, extends through the resilient plate, the tightening member, and the slot in sequence, and is secured to the sliding block by threading connection.

10. The pivot device as claimed in claim 9, wherein the first interlink is disposed around a first end of the second wheel, wherein the second interlink is disposed around a second end of the second wheel opposite to the first interlink, wherein a first fastener and a second fastener are coupled to the second wheel, wherein the first fastener abuts against a side of the first interlink opposite to the second wheel, wherein the first fastener extends through the first interlink and is secured to the second wheel by threading connection, wherein the second fastener abuts against a side of the second interlink opposite to the second wheel, and wherein the second fastener extends through the second interlink and is secured to the second wheel by threading connection.

* * * * *